(12) United States Patent
Lambert et al.

(10) Patent No.: US 6,282,649 B1
(45) Date of Patent: Aug. 28, 2001

(54) METHOD FOR CONTROLLING ACCESS TO ELECTRONICALLY PROVIDED SERVICES AND SYSTEM FOR IMPLEMENTING SUCH METHOD

(75) Inventors: Howard Shelton Lambert, Southampton; James Ronald Lewis Orchard, Winchester, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/115,447

(22) Filed: Jul. 14, 1998

(30) Foreign Application Priority Data

Sep. 19, 1997 (GB) .................................................. 9719874

(51) Int. Cl.[7] .............................. H04L 9/32; G06F 12/14
(52) U.S. Cl. ........................ 713/167; 713/166; 713/185; 705/71; 380/277
(58) Field of Search .................................... 713/165–167, 713/185, 193; 380/45, 277; 705/72, 71

(56) References Cited

U.S. PATENT DOCUMENTS

| | | | |
|---|---|---|---|
| 4,357,529 | * 11/1982 | Atalla | 705/72 |
| 4,713,753 | * 12/1987 | Boebert et al. | 711/164 |
| 4,816,653 | 3/1989 | Anderl | 235/382 |
| 4,864,616 | * 9/1989 | Pond et al. | 713/165 |
| 5,285,055 | 2/1994 | Oonakahara | 235/380 |
| 5,502,766 | * 3/1996 | Boebert et al. | 713/193 |
| 5,657,388 | * 8/1997 | Weiss | 713/185 |

FOREIGN PATENT DOCUMENTS

| | | |
|---|---|---|
| 0286094 A2 | 10/1988 | (EP) . |
| 2104696 | 3/1983 | (GB) . |

OTHER PUBLICATIONS

"Computer Dictionary", Microsoft Press, third edition, 1997, definition of "applet".*

* cited by examiner

Primary Examiner—Gilberto Barron, Jr.
(74) Attorney, Agent, or Firm—Louis P. Herzberg

(57) ABSTRACT

The security of stored data and applications is improved by and access control system and method in which user keys for accessing the stored data/services which keys are provided to users are representative of the user's level of authority, such that there is no need to maintain a separate lookup table of user authority levels. This removes a potential security exposure from the system.

The user keys are advantageously hierarchical, including data for generating a plurality of different access keys for each of a plurality of different access levels. The access keys may be decryption keys for encrypted data or application programs. The invention is applicable to SmartCard systems.

24 Claims, 3 Drawing Sheets

METHOD FOR CONTROLLING ACCESS TO ELECTRONICALLY PROVIDED SERVICES AND SYSTEM FOR IMPLEMENTING SUCH METHOD

FIELD OF THE INVENTION

This invention relates generally to the control of access to stored data and/or electronically provided services.

BACKGROUND OF THE INVENTION

An example of such a service is the dispensing of cash by an automatic teller machine (ATM). Access to facilities provided by the ATM are typically controlled by requiring a user to present a personalised plastic card carrying data on a magnetic stripe to a card reader associated with the ATM. The user is required to key in a personal identification number (PIN) which is used by the system to access data in the card which together with data held in the system relating to the user enables the system to determine whether the requested transaction should be authorised.

The principle has been considerably extended to many types of transactions including the purchase of goods in retail outlets, access to processes on computer networks and the provision of stockbroking services. As the sophistication of the services has increased so has the need for increased flexibility and security in the control of access. For example, it is important that providers of services through retail tills/terminals or ATM's are assured that such services may only be accessed by authorised end-users with a valid access card, at a valid till and, where appropriate, under the control of an authorised sales assistant or other operator. Applications providing services may be held on the system in an encrypted form requiring a decryption key to access them, and the decryption key is then only provided to identified authorised users when they present a valid access card. It is also desirable to provide an audit trail for each transaction to facilitate the detection of fraud and the settlement of any dispute that may arise from the transaction.

An improved form of plastic card, called the Smart Card, has been developed which by incorporating within it active data processing and storage facilities provides enhanced security and flexibility. Data and application programs can be made inaccessible until an authorised person (as identified by personal information input by that person) presents their SmartCard. The present invention is suitable for use with SmartCards but is not limited thereto.

A problem arises when seeking to control access to application program modules where a number of different users are required to be allowed to access different sets of application modules. For example, in a retail environment, it may be desirable for all till operators to run certain applets associated with sales whereas only the store manager can access other applets associated with stock control or payroll. The conventional approach to this problem is for a computer LOG ON procedure to include identification of the user from user input data (and optionally additional data held on a token such as a SmartCard). A table lookup process then scans a static list to determine the access authority of the user, and the user is given access to certain applications according to their determined authority level.

Such conventional systems relying on lookup tables of user authorities are vulnerable to breaches of security even if the applications themselves are held in a protected (e.g. encrypted) form if the list can be tampered with. An unauthorised person may seek to add themselves to the list or to change their authority level within the list.

SUMMARY OF THE INVENTION

In a first aspect, the invention provides a data processing system including means for controlling user access to data or services, wherein data or application modules for providing the service are stored in a form which is inaccessible without an access key. Users are each allocated a specific 'user key' which is appropriate for their level of access authority. When a user requests access to stored data or requests a service for which stored software modules must be accessed, the data or modules are interrogated to identify their stored security access level. If the user key represents the required level of access authority an access key is generated from the user key for accessing that data or service.

Since user keys include the data for generating access keys once a stored module has been interrogated, the user key directly determines the user's authority level and so there is no need to rely on separate lists of user authorities. This represents a significant security advantage.

The generated user keys are preferably hierarchical keys which include data for generating an access key for each of a plurality of different access levels (that is, where the owner of the user key is authorised for more than one level). The access key is generated from the hierarchical user key after interrogating the requested data or software module to determine which of the possible access keys is required.

The access keys according to a preferred embodiment of the invention are decryption keys for accessing data or application modules stored in an encrypted form.

The user key may be dynamically generated when the user logs on to the system or it may be pregenerated and, for example, stored on a token such as a SmartCard. In a preferred embodiment of the invention, a user key is dynamically generated when a user presents a token and inputs personal data (for example a personal identification number or PIN, input via a keypad), combining these separate data portions to produce the key.

In a second aspect of the invention, there is provided a method for controlling user access to data or services via a computer system, including the steps of:

storing said data or services in a form accessible only under the control of one or more access keys;

providing users with a user key representing their authority level for accessing specific data or services; and in response to a user request for access to said stored data or services, determining the access level of the requested data or services and, if the user's authority level as represented by the user key matches the determined access level, generating from said user key an access key for accessing said data or services.

In a third aspect of the invention, there is provided a security interface for a computer system for controlling user access to data or services stored on said system in a form accessible only under the control of one or more access keys, the security interface including:

means for generating a user key representing a user's authority level for accessing specific data or services; and means, responsive to a user request for access to stored data or services, for determining the security access level of the requested data or services; and means for generating from said user key an access key for accessing said data or services if the user's authority level as represented by the user key matches the determined access level.

The invention may be implemented as a computer program product comprising computer readable program code stored on a computer readable storage medium, the computer program code providing the functions for controlling access to stored data or services.

In a typical system the personal data relating to the user will be a personal identification (PIN) number and the data receiving means will be a simple keypad. However in a more advanced system the data may be developed from biometric data read by a reader adapted to recognise particular facial or other characteristics of the user such as fingerprint or hand geometry.

In order to provide an audit trail there may also be developed, at the same time as the generation of the access key, data identifying the end user, the token used and any operator involved, together with the date of the transaction and any other information required to establish an audit trail.

The system is preferably organised to operate under the control of an object orientated (OO) programming language and the services are stored in the form of encrypted object oriented "applets".

In a number of applications, particularly where transactions are performed in association with an operator or operators, it is desirable to make provision for access to processes according to the level of authority delegated to the operator or operators involved. In one embodiment of the invention, a set of applications is made available to all operators of check-out tills in a retail environment whilst a further set of applications is available only to supervisors. In another embodiment of the invention, different sets of applets may be decrypted according to the authority of an operator as identified when the operator logs on to a particular terminal. In such a system, a hierarchy of access levels may be established by associating with each applet a level of access such that the applet is accessible only to operators or users able to satisfy the system that they have the appropriate access authority level.

In a preferred system embodying the invention provision is made for accepting smart cards. Advantage is taken of the processing and storage facilities available on the card to perform the key generation on the card itself and, where sufficient processing capacity is available, the decryption itself. The dynamic generation of the decryption key on the smart card provides the considerable security advantage that the personal information on the card relating to the user need never leave the card. Moreover further security advantages may be obtained by generating a key, or set of keys representative of a user's personal level of authority to access particular services, obviating the need to maintain a separate list of operators and their access authorities. Prior systems requiring such a list are vulnerable to breaches of security if such a list is tampered with.

BRIEF DESCRIPTION OF DRAWINGS

In order that the invention may be well understood, preferred embodiments thereof will now be described by way of example, with reference to the accompanying drawings in which.

Detailed Description of the Preferred Embodiment

Figure 1:
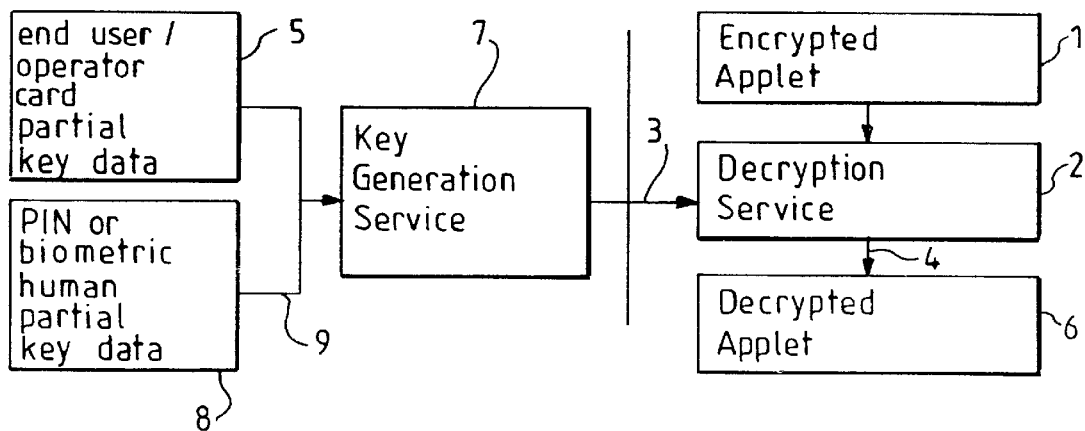
FIG. 1. shows a basic access control system embodying the invention.

Referring to FIG. 1. there is shown in simplified form the basic features of a retail till or automatic teller terminal embodying the invention. An application store (1) is provided to retain in encrypted form those applications which the terminal may be called on to perform, according to the authority of users requesting the application. In a preferred system embodying the invention the applications take the form of object oriented "applets". Such "applets" may be stored in the terminal on a permanent or semi-permanent basis or may be erased and replaced from time to time from a central storage device according to the needs of the terminal. A decryption service module (2), typically a software module arranged to control a processing unit, is provided to decrypt a selected applet under the control of a decryption key provided over a bus (3). The decrypted applet is provided to a register (6) over a bus (4) to control operation of the requested service.

Partial key data (5) is read from a card presented by a user and supplied to a key generator (7). Personalised data such as a personal identification number (PIN) or biometric data is obtained from the user by a reader (8) which supplies this further data over a bus (9) for combination with the data (5) in the key generator (7) to develop a decryption key to be supplied to the decryption service (2) over bus (3).

The preferred system provides for access to be controlled using a smart card. When such a card is presented the key generation service is performed on the card using its processing and data storage facilities, minimising the amount of customer personal data supplied to the terminal and thus enhancing the security of the system. If sufficient processing and storage facilities are available on the card, the security of the system may be further enhanced by performing the decryption process itself using these facilities.

On power up, the till program invokes an applet controlling operator LOG ON. This applet requires the operator to insert his or her smart card and additionally to provide either PIN or biometric data. Partial data is read from the operator's card and combined with the PIN or biometric data supplied to provide an input to the key generator (7) enabling it dynamically to generate a key or keys permitting the decryption of applets.

The till program also invokes a LOG ON applet for each customer requesting a service, reading partial key data from his or her card and collecting PIN/biometric data and providing this data as input to the key generating service.

When a service is invoked, for example if the operator initiates a payment, the applet controlling payment is invoked, and the decryption service (2) accesses the key generator which provides:

1. If authorised, a dynamically generated decryption key.

2. Data identifying the end user and the operator and their respective cards.

Figure 2:
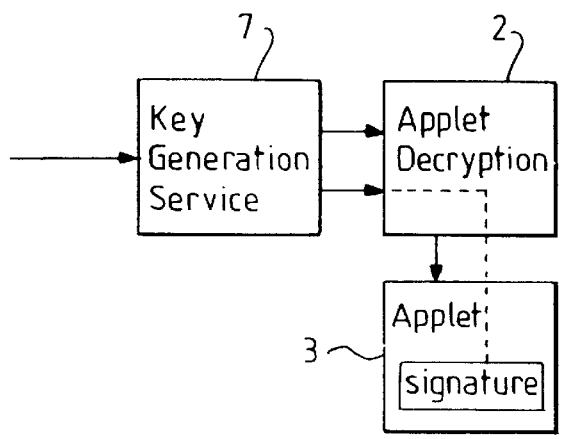
FIG. 2. is a block diagram showing the manner in which an audit trail is developed in the system of FIG. 1.

The decryption service then uses the decryption key to decrypt the applet to perform the requested service. The data identifying the end user and the operator is, as shown in FIG. 2, used to "sign" the transaction, for example by inserting a message authorisation code (MAC) into information sent to the server to which the till is attached. The latter may then log audit trail data for retention with details of the transaction.

Figure 3:
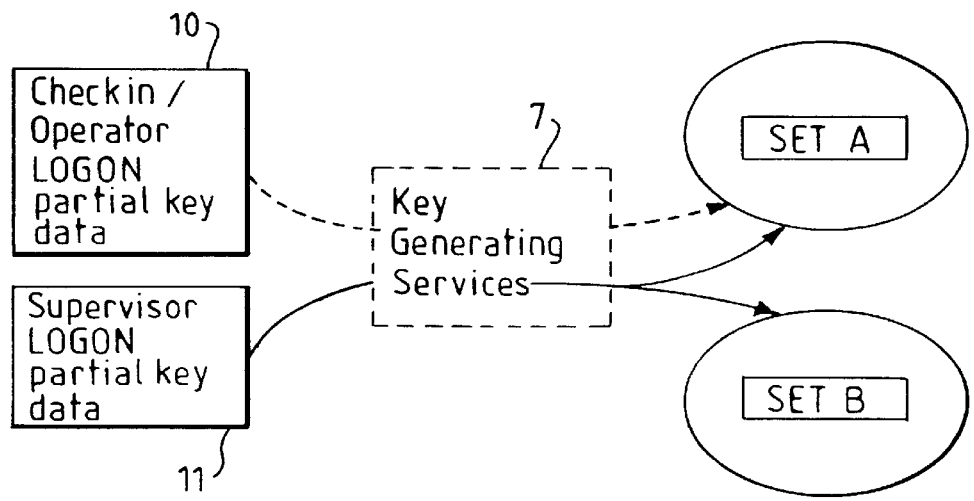
FIG. 3. shows an embodiment of the invention providing two different levels of access according to the authority of the operator or user of a requested service.

In certain applications it may be required that only certain operators may access the till/terminal services, and that the services they can access, are limited to those pre-defined for the operator's authority level and for the business purpose of the till. It may additionally be required that certain operators having a higher level of authority, for example supervisors, may concurrently have access to a till or terminal. FIG. 3. shows an embodiment of the invention which addresses such requirements.

Referring to FIG. 3. there is shown a till/terminal environment with two sets of stored applets (A) and (B), set A being accessible to operators and supervisors of checkout tills and set B only available to supervisors. In the embodiment of FIG. 3. operator log on is controlled by a till program which determines according to business needs whether multiple log ons are permitted, and if so, permits only multiple log ons which conform to certain rules. For example the rule may require that only one valid operator is permitted with one valid supervisor, there being no other valid case of multiple log on.

In the embodiment shown in FIG. 3. partial key data from the till operator is read at (10), and corresponding data from the supervisor at (11). The data is supplied to the key generator (7) to develop a key or keys which control the selection of an application applet from set A or set B or both according to the authority of the check-in operator.

Figure 4:
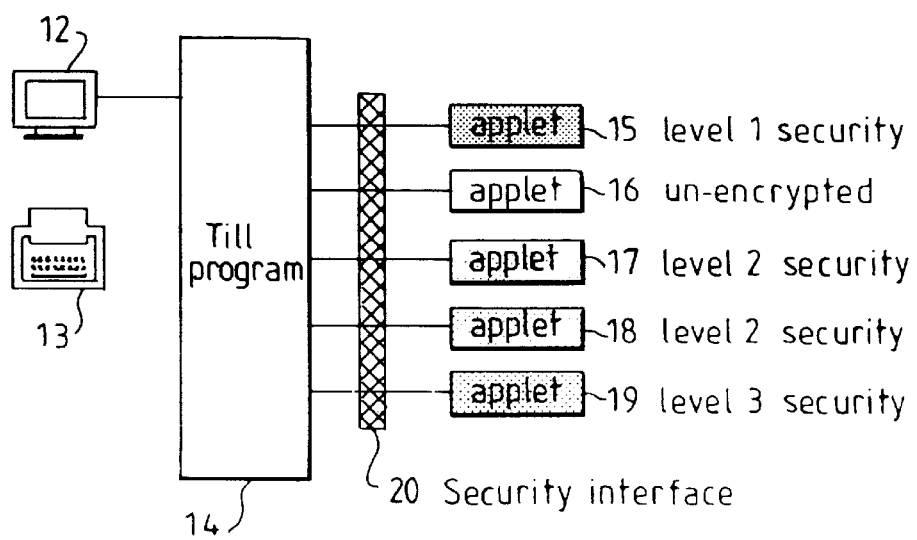
FIG. 4. shows an embodiment of the invention providing a hierarchy of authority according to security levels allocated to various users or operators.

FIG. 4. shows an embodiment which provides a number of levels of authority permitting only operators having a security level matching or exceeding a pre-determined threshold to execute a classified applet.

Referring to FIG. 4., a checkout terminal includes a display (12) and a console (13) operating under the control of a till program (14) resident in the terminal to process user initiated transactions involving various application modules or applets (15–19). Access to the applets by the till program is regulated by a security interface (20) which includes a key generator and decryption facilities as already described with reference to FIG. 1. As described with reference to FIG. 1., when a till operator logs on at the console with a personal smart card that stores their details together with a partial decryption key, the remainder of the key, for example a personal identification number (PIN) is entered at the console (13). The whole decryption key so derived defines the security level of the operator as described below.

Figure 5:
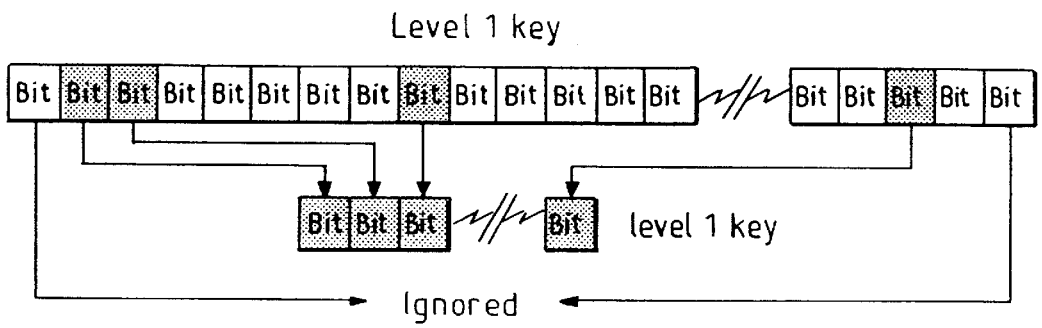
FIGS. 5, 6 and 7 illustrate the development of different levels of decryption key in the embodiment of FIG. 4.
Figure 6:
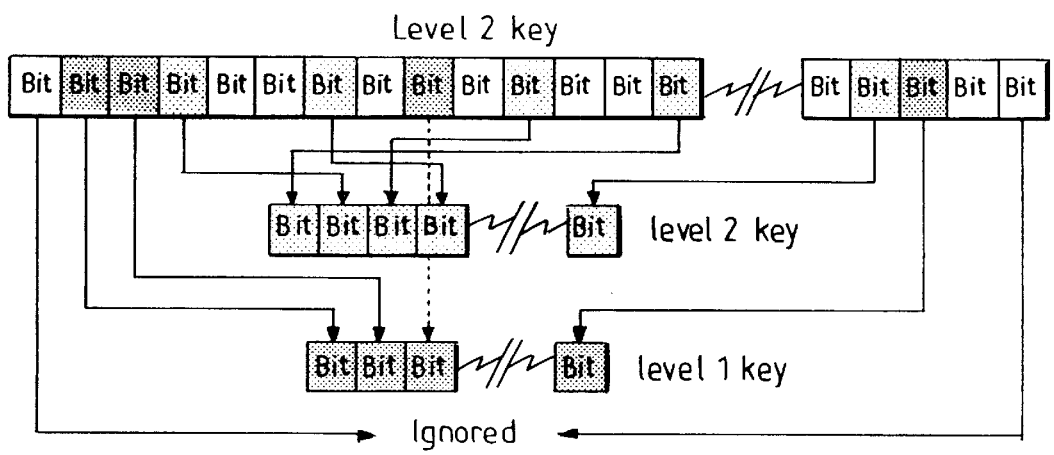
Figure 7:
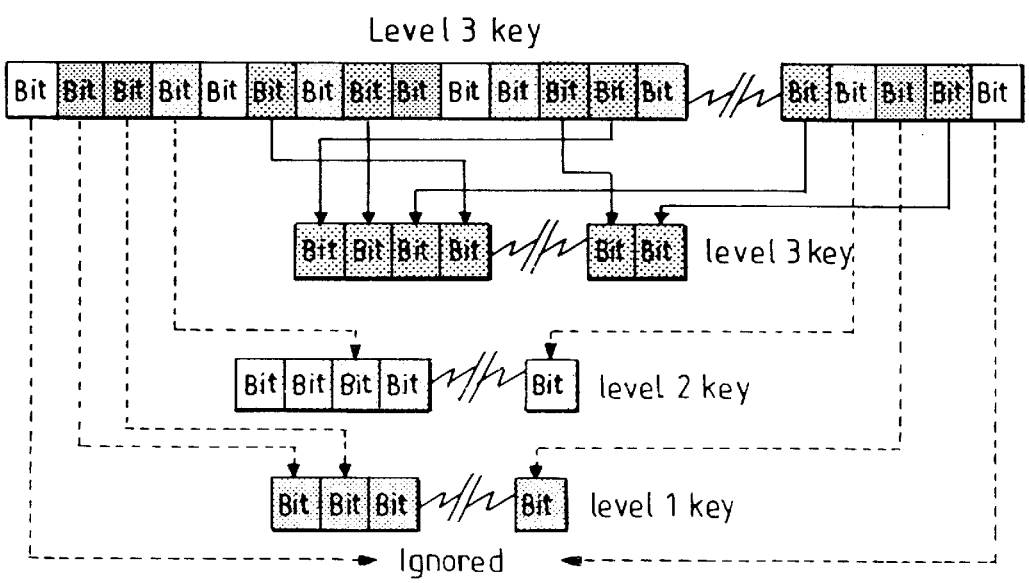

In this embodiment the string of bits constituting the decryption key is processed using an algorithm which selects those bits which are to be used for a given security level. Preferably higher security levels include the bit pattern of the lower security levels, permitting a higher level decryption key to be used to decrypt a lower level applet. FIGS. 5–7 provide examples of how the bits used for the security level keys may be inter-mixed in a final decryption key.

In the example shown there are four security levels, 0, 1, 2 and 3. Security level 0 is allocated to applets of such low security that no encryption is required. Level 1 is allocated to the lowest level of encryption, level 2 to a higher level of encryption which includes level 1 and level 3 to a still higher level which includes both levels 1 and 2. When an applet in encrypted the following data is supplied:

a user key a security level a master key

The key generator (7) in the security interface (20) operates in accordance with an algorithm which causes bit patterns to be generated which will be used to develop a user de-cryption key which is unique and specific to the user seeking access to an applet and an imbedded code included in the encrypted applet which identifies the security level allocated to that particular applet. Once the keys have been generated any encryption/decryption system may be used.

FIGS. 5–7 illustrate the manner in which keys are developed in the security interface (20) for the various security levels.

Clearly for level 0, the associated applets are in plain language and no key is required. As shown in FIG. 5 the key generation algorithm is arranged to select a group of bits from the bit string developed from the data read by till program (14) when the user logs on. It will be appreciated that this is a simple example of how the algorithm may operate to select the various bits. In practice various bit transpositions or arithmetic operations may be used to generate the final key.

As shown in FIG. 6 a number of additional bits are selected which, together with the bits already selected for level 1, constitute the level 2 key. Similarly as shown in FIG. 7. further bits are selected to supplement those already selected for level 1 and level 2 to constitute the level 3 key.

The algorithm used to select the bits and the order in which they are re-combined may be different for each key level and may include bits selected from the lower level keys. Thus when a request is made for access to a particular applet the decryption algorythm uses the user key in conjunction with the security level encoded within the encrypted applet to determine the key level. The appropriate bit pattern is selected from the user key, thus permitting the appropriate decryption bit key sequence to be generated. Upon completion of the decryption a user identifier is inserted into the applet so that at execution time the applet can indicate the operator for whom it was decrypted.

While the invention has been described above in relation to transaction terminals it will be appreciated that it is applicable in any situation where access is sought to processes or other potentially sensitive material in the course of a card initiated transaction. For example it may readily be applied to environments such as the Internet in which access is sought to software and may only be granted if the requestor is appropriately authorised.

What is claimed is:

1. A method for controlling user access to data or services via a computer system, including the steps of:

storing said data or services in a form of objects in an object oriented programming language accessible only under the control of one or more access keys;

providing users with a smartcard containing a user key generator for dynamically generating on the smartcard, from a user's ID entered by the user and key data contained in the smartcard, a user key representing the user's authority level or levels for accessing specific data or services;

in response to a user request for access to said stored data or services, determining the access level of the requested data or services; and if the user's authority level as represented by the user key matches the determined access level, generating from said user key an access key for accessing said data or services.

2. A method according to claim 1, wherein said user key is an hierarchical key including data for generating a different access key for each of a plurality of different access levels for each of the authority levels which the user possesses.

3. A method according to claim 2, wherein the storing step comprises storing the objects in an encrypted form and said generated access keys are decryption keys.

4. A data processing system including means for controlling user access to data or services, the system including:
   means for storing said data or services in applets of an object oriented programming language in a form accessible only under the control of one or more access keys;
   smartcard means containing a key generator for generating, using a user ID entered by the user and key data contained in the smartcard means, a user key representing a user's authority levels for accessing data or services; and
   means, responsive to a user request for access to stored data or services, accompanied by the user key, for determining the access level of the requested data or services; and
   means for generating from said user key an access key for accessing the requested data or services if one of the user's authority levels as represented by the user key matches the determined access level.

5. A data processing system according to claim 4, wherein said means for generating user keys is adapted to generate a hierarchical key string including data for generating a separate access key for each of a plurality of different access levels.

6. A data processing system according to claim 5, wherein said means for storing includes means for encrypting said applets providing said data or services and wherein said means for generating an access key comprises means for generating a decryption key.

7. An article of manufacture comprising a computer usable medium having computer readable program code means embodied therein for causing the control of user access to data or services via a computer system, the computer readable program code means in said article of manufacture comprising computer readable program code for performing the steps of:
   storing said data or services as encrypted applets of an object oriented programming language in a form accessible only under the control of one or more access keys said applets containing a security level encoded therein;
   providing a decryption algorithm for responding to a user key from a smartcard generator for generating from a user input identifying the user and key data contained in the smartcard, the user key representing a user's authority level or levels for accessing specific encrypted applets containing data or services;
   in response to a user request for access to stored data or services in an encrypted applet, determining the access level contained in that applet with the decryption algorithm and then interrogating the user key for that authority level,
   if the user's authority level as represented by the user key matches the determined access level, generating from said user key an access key for accessing said data or services.

8. An article of manufacture as recited in claim 7, wherein said user key is an hierarchical key including data for generating a separate access key for each of a plurality of different access levels.

9. A program storage device readable by machine, tangibly embodying a program of instructions executable by the machine to perform method steps for controlling user access to data or services via a computer system, said method steps comprising:
   storing said data or services as a hierarchy of applets of an object oriented programming language, the applets at each level of the hierarchy accessible only under the control of a different access key for each of the levels;
   providing users with a user key representing the user's authority level for accessing specific data or services; and
   in response to a user request for access to said stored data or services, accompanied by said user key, determining the access level of the applet of the requested data or services and, if the user's has an authority level, represented in the user key, that matches the determined access level, generating from said user key an access key for accessing said data or services wherein said user key is a hierarchical key string including data for generating a separate access key for each of a plurality of different access levels.

10. A program storage device readable by machine as recited in claim 9, wherein the storing step comprises storing data and/or application modules in an encrypted form and said generated access keys are decryption keys.

11. A program storage device readable by machine as recited in claim 9, wherein said user key is dynamically generated on a smartcard of the user in response to a user request initiated by presentation of a token by a user, from token data read from said token and personal data provided by the user to the smartcard.

12. The method of claim 1 including providing a decoding means in said smartcard for decoding the data.

13. The method of claim 3 including providing a user key with a fixed number of bit positions irrespective of the authority level or levels of the user with certain of the bit positions being unused and the remaining bit positions forming different combinations each combination of bit positions being for a different authority level.

14. The method of claim 13 including embedding in each of the encrypted objects the security level allocated to that particular object.

15. The method of claim 14 including having the decryption algorithm select the combination of bit positions from the user key assigned to the authority level of the particular object.

16. The method of claim 15 including providing an audit trail at the time of generating of the access key including information identifying the user and any operator involved in the transaction together with the date of the transaction.

17. The data processing system of claim 4, wherein said smartcard means provides a user key with a fixed number of bit positions irrespective of the authority level or levels of the user with certain of the bit positions being unused and the remaining bit positions forming different combinations each combination of bit positions being for a different authority level.

18. The data processing system of claim 4, wherein the encrypted applets contain encoded therein the security level allocated to the particular applet.

19. The data processing system of claim 17 including a decryption algorithm that selects the bit positions from the user key assigned to the authority level of the particular applet.

20. The article of manufacture of claim 7, wherein the decryption algorithm is responsive to a user key with a fixed number of bit positions irrespective of the authority level or levels of the user with certain of the bit positions being unused and the remaining bit positions forming different combinations each combination of bit positions being for a different authority level.

21. The article of manufacture of claim 19 including having the decryption algorithm select the combination of bit positions from the user key assigned to the authority level of the particular object.

22. The article of manufacture of claim 20 including providing an audit trail at the time of generating of the access key including information identifying the user and any operator involved in the transaction together with the date of the transaction.

23. The article of manufacture of claim 9, wherein the decryption algorithm is responsive to a user key with a fixed number of bit Positions irrespective of the authority level or levels of the user with certain of the bit positions being unused and the remaining bit positions; forming different combinations each combination of bit positions being assigned to a different authority level.

24. The article of manufacture of claim 22 including having the decryption algorithm select the combination of bit positions from the user key assigned to the authority level of the particular object.

* * * * *